(12) United States Patent
Tabayashi

(10) Patent No.: US 9,120,931 B2
(45) Date of Patent: Sep. 1, 2015

(54) WATER-BASED INK

(75) Inventor: Isao Tabayashi, Tomi (JP)

(73) Assignee: MIMAKI ENGINERRING CO., LTD., Tomi, Nagano (JP)

( * ) Notice: Subject to any disclaimer, the term of this patent is extended or adjusted under 35 U.S.C. 154(b) by 103 days.

(21) Appl. No.: 13/881,729

(22) PCT Filed: Oct. 26, 2011

(86) PCT No.: PCT/JP2011/074670
§ 371 (c)(1),
(2), (4) Date: Jul. 1, 2013

(87) PCT Pub. No.: WO2012/057205
PCT Pub. Date: May 3, 2012

(65) Prior Publication Data
US 2013/0269569 A1    Oct. 17, 2013

(30) Foreign Application Priority Data

Oct. 27, 2010 (JP) ................................. 2010-241103

(51) Int. Cl.
C09D 11/00 (2014.01)
C09D 1/00 (2006.01)
C09D 11/32 (2014.01)
C09D 11/52 (2014.01)

(52) U.S. Cl.
CPC *C09D 1/00* (2013.01); *C09D 11/32* (2013.01); *C09D 11/52* (2013.01)

(58) Field of Classification Search
USPC .................. 106/31.6, 31.28, 31.75, 31.65
See application file for complete search history.

(56) References Cited

U.S. PATENT DOCUMENTS 5,972,087 A * 10/1999 Uraki et al. ................ 106/31.65

FOREIGN PATENT DOCUMENTS

| | | |
|---|---|---|
| JP | 08-003498 A | 1/1996 |
| JP | 09-194776 A | 7/1997 |
| JP | 2000-513396 A | 10/2000 |
| JP | 2003-12985 A | 1/2003 |
| JP | 2006-299348 A | 11/2006 |
| JP | 2008-527169 A | 7/2008 |
| JP | 2008-297323 A | 12/2008 |
| JP | 2009-138162 A | 6/2009 |
| JP | 2009-275227 A | 11/2009 |

OTHER PUBLICATIONS

International Search Report in International Application No. PCT/JP2011/074670, dated Jan. 31, 2012.

* cited by examiner

*Primary Examiner* — Veronica F Faison
(74) *Attorney, Agent, or Firm* — Park, Kim & Suh, LLC

(57) ABSTRACT

Water-based ink having characteristics of a metal nanoparcile or metal ion and substantially reduced aggregation is provided. The water-based ink includes a metal compound in which an organic ligand is coordinated to a metal nanoparticle and/or a metal ion, and a coloring pigment and/or a coloring dye.

9 Claims, No Drawings

WATER-BASED INK

CROSS-REFERENCE TO RELATED APPLICATIONS

This application is the National Stage filing under 35 U.S.C. 371 of International Application No. PCT/JP2011/074670, filed on Oct. 26, 2011, which claims the benefit of Japanese Patent Application No. 2010-241103, filed on Oct. 27, 2010, the contents of which are all hereby incorporated by reference herein in their entirety.

TECHNICAL FIELD

The present disclosure relates to water-based ink.

BACKGROUND ART

Conventionally, dispersed liquid (hereinafter referred to as "ink") where metal particles are dispersed into a solvent such as water in order to obtain conductive films or conductive printed matters. Patent Document 1 discloses that a microencapsulated metal particle covered with a polymer having an ionic group is used in inkjet ink. In addition, Patent Document 2 discloses ink suitable for the production of electrically conductive printed images, which are based on nanoscale silver particles and at least one, preferably polymeric, dispersing agent in an aqueous formulation and a process for the manufacture thereof.

PRIOR ART DOCUMENTS

Patent Documents

Patent Document 1: Japanese Patent Laid-open No. 2006-299348
Patent Document 2: Japanese Patent Laid-open No. 2009-275227

DISCLOSURE OF INVENTION

Technical Problem

Water-based ink for printing matter decorations includes a coloring pigment or coloring dye in general. Difference between such water-based ink and the dispersed liquid in the background art is that the former includes the coloring pigment or coloring dye.

Metal nanoparticles or metal ions are known to have antibacterial effect based on types of metals. Thus, inventors of the present disclosure acknowledged that the antibacterial effect can be enhanced by including metal particles or metal ions in the water-based ink.

However, since the water-based ink including the pigment or dye includes the metal particles or metal ions, the metal particles or metal ions are aggregated by the reaction of the pigment or dye. If the aggregation of the metal particles or metal ions occurs, printing image is worsened by ink blots. If an inkjet printer is used for printing, small tubes inside its nozzles or heads will be clogged up.

The microencapsulated metal particles are used in the patent document 1 in order to prevent the aggregation. However, since the metal particles are covered with the polymer, the characteristics of the metal particles are not sufficiently enhanced in the water-based ink.

Thus, the present disclosure is to provide the characteristics of metal nanoparticles or metal ions sufficiently enhanced in water-based ink and provide water-based ink with sufficiently suppressed aggregation.

Technical Solution

Water-based ink according to an embodiment of the present disclosure includes a metal compound in which an organic ligand is coordinated to a metal nanoparticle and/or a metal ion, and a coloring pigment and/or dye.

Since the water-based ink according to the embodiment contains the metal compound, it has the characteristics that belong to the metal nanoparticle or metal ion. In addition, since the organic ligand is coordinated to the metal nanoparticle and/or metal ion in the metal compound, its aggregation with the coloring pigment and/or dye is sufficiently reduced.

Thus, the water-based ink according to the embodiment has the characteristics of the metal nanoparticle or the metal ion. In addition, it sufficiently prevents printing blots and the inkjet printer nozzles and printer heads from being blocked or clogged due to the aggregation.

The metal compound included in the water-based ink according to the embodiment can be a silver compound and/or a cobalt compound.

When a silver compound is used as the metal compound, the water-based ink has the antibacterial characteristic. In addition, when a cobalt compound is used as the metal compound, the water-based ink has the antimicrobial characteristic. An organic ligand is coordinated to a silver nanoparticle and/or a silver ion in the silver compound. Similarly, an organic ligand is coordinated to a cobalt nanoparticle and/or a cobalt ion in the cobalt compound.

The organic ligand is preferably a compound including a sulfur atom. The aggregation of the metal compound can be further reduced by using the organic ligand including the sulfur atom.

In addition, the organic ligand is preferably a compound represented by the following formula (1). By using this organic ligand, the aggregation of the metal compound can be substantially reduced and the water-based ink can have the characteristics that belong to the metal nanoparticle or metal ion in a more efficient manner.

[Chemical Formula 1]

$$HS-R^1-R^2-X \quad (1)$$

where each of $R^1$ and $R^2$ is a group represented by the following formula (2), a carbonyl group, or an imino group, and X is a coordinating functional group.

[Chemical Formula 2]

(2)

where each of $R^3$ and $R^4$ is a hydrogen atom, an alkyl group, an aryl group, an alkyloxy group, or an aryloxy group.

The organic ligand is preferably 2-mercaptoacetic acid or 2-mercaptoethylamine. Then the aggregation of the metal compound can be further reduced, and the water-based ink can have the characteristics of the metal nanoparticle or metal ion in a more efficient manner.

In addition, the metal nanoparticle preferably has an average particle diameter of 6 to 100 nanometers. It was difficult to include the metal nanoparticle in that size in the conventional water-based ink together with a coloring pigment or a coloring dye which is easily aggregated. However, the aggregation is substantially reduced according to the embodiment of the present disclosure even when the water-based ink includes a metal nanoparticle having such average diameter.

A pH of the water-based ink according to the embodiment is preferably in the range of 5 to 10. In this water-based ink the aggregation of the metal compound can be further reduced.

Furthermore, the metal compound can be present in an amount of 1 to 2000 mass ppm based on a total mass of the water-based ink. By limiting the concentration of the metal compound in the water-based ink in this range, the water-based ink can have the characteristics of the metal nanoparticle or metal ion in a much more efficient manner.

Advantageous Effects

The water-based ink according to the present disclosure has the characteristics that belong to metal nanoparticles or metal ions, and its aggregation is sufficiently reduced.

BEST MODE FOR CARRYING OUT THE INVENTION

Reference will now be made in detail to the preferred embodiments of the present disclosure. Wherever possible, the same reference numbers will be used throughout the disclosure to refer to the same or like parts.

The water-based ink according to a present embodiment of the present disclosure includes a metal compound in which an organic ligand is coordinated to a metal nanoparticle and/or a metal ion, and a coloring pigment or dye. In the present disclosure, a particle having a particle diameter of 100 nm or less is referred to as a "nanoparticle".

Since the water-based ink according to the present embodiment includes the metal compound, the water-based ink has the characteristics that belong to the metal nanoparticle or the metal ion. Also, since the organic ligand is coordinated to the metal nanoparticle and the metal ion in the metal compound, the aggregation between the metal compound and the coloring pigment or dye is sufficiently reduced. Thus, the water-based ink according to the present embodiment has the characteristics of the metal nanoparticle or the metal ion. In addition, it sufficiently prevents printing blots and the inkjet printer nozzles and printer heads from being blocked or clogged due to the aggregation.

A metal nanoparticle is a nanoparticle composed of one or more metals. Examples of such metals are gold, silver, bronze, white gold, palladium, nickel, iridium, rhodium, and cobalt. The metal nanoparticle can be composed of only one type of metals or it can be composed of two or more types of metals. Also, only one type of metal nanoparticles can be used or two or more types of metal nanoparticles can be used in combination.

The water-based ink according to the present embodiment can have various characteristics depending on the metals included in the nanoparticle. For example, if the metal nanoparticle includes silver, the water-based ink has the antibacterial characteristics. If the metal nanoparticle includes cobalt, the water-based ink has the anti-microbial characteristics.

The average particle diameter of the metal nanoparticle is preferably 6 to 100 nm. It is difficult to include a metal nanoparticle in that size in the conventional water-based ink with a coloring pigment or dye which is easily aggregated. However, when a metal nanoparticle in that size is included in the water-based ink according to the present embodiment, the aggregation is sufficiently reduced.

Examples of a metal ion is a gold ion ($Au^+$), a silver ion ($Ag^+$), a bronze ion ($Cu^+$, $Cu^{2+}$), a white gold ion ($Pt^{2+}$), a palladium ion ($Pd^{2+}$), a nickel ion ($Ni^{2+}$), an iridium ion ($Ir^{2+}$), a rhodium ion ($Rh^{2+}$), and a cobalt ion ($Co^{2+}$). Also, only one type of metal ions can be used or two or more types of metal ions can be used in combination.

The water-based ink according to the present embodiment can have various characteristics depending on the metal ions. For example, if the water-based ink includes a silver ion as a metal ion, the water-based ink has the antibacterial characteristics. If the water-based ink includes a cobalt ion as a metal ion, the water-based ink has the antimicrobial characteristics.

Since the organic ligand is coordinated to the metal nanoparticle or the metal ion, the aggregation of the metal nanoparticle or the metal ion due to the reaction of the coloring pigment or dye is reduced.

The organic ligand is preferably a compound that includes a sulfur atom. Since such compound is strongly coordinated to the metal nanoparticle or the metal ion through the sulfur atom, the aggregation is further reduced.

The organic ligand is preferably a compound that is represented by the following formula (1).

[Chemical Formula 3]

$$HS-R^1-R^2-X \qquad (1)$$

In the formula (1), each of $R^1$ and $R^2$ is a group represented by the following formula (2), a carbonyl group, or an imino group, and X is a coordinating functional group. The carbonyl group is represented by —C(=O)— and the imino group can be a group represented by the following formula (3).

[Chemical Formula 4]

(2)

In the formula (2), each of $R^3$ and $R^4$ is a hydrogen atom, an alkyl group, an aryl group, an alkyloxy group or an aryloxy group.

The organic ligand having the particular structure described above does not lose the characteristics of the metal nanoparticle or the metal ion, and the aggregation of the metal nanoparticle or the metal ion due to the reaction of the coloring pigment or dye can be further reduced.

Moreover, when the water-based ink is printed on a printing matter, the durability of the effects of the metal nanoparticle or the metal ion (for example, antibacterial or antimicrobial effects on the printing matter) and resistance to laundering of the printing matter can be further enhanced due to the particular structure of the organic ligand.

The carbon number of the alkyl group is preferably 1 to 20. The alkyl groups of the carbon number of 1 to 20 are methyl, ethynyl, propyl, butyl, pentyl, hexyl, hepthyl, octyl, nonyl, decyl, undecyl, dodecyl, tridecyl, tetradecyl, and pentadecyl groups. These groups can have a straight chain structure, a branched structure, or a cyclic structure.

The carbon number of the aryl group is preferably 6 to 20. The aryl groups of the carbon number 6 to 20 are phenyl, tolyl, and naphthyl groups.

The carbon number of the alkyloxy group is preferably 1 to 20. The alkyloxy groups of the carbon number of 1 to 20 are methyloxy, ethyloxy, propyloxy, butyloxy, pentyloxy, hexyloxy, hepthyloxy, octyloxy, nonyloxy, decyloxy, undecyloxy, dodecyloxy, tridecyloxy, tetradecyloxy, and pentadecyloxy groups. Each alkyl group included in the alkyloxy groups can have a straight chain structure, a branched structure, or a cyclic structure.

The carbon number of the aryloxy group is preferably 6 to 20. The aryloxy groups of the carbon number of 6 to 20 are phenyloxy, tolyloxy, and naphthyloxy groups.

The coordinating functional group is a functional group that can be coordinated to the metal nanoparticle or the metal ion. The coordinating functional group is preferably a hydroxy group, a thiol group, or an amino group. Such coordinating functional group does not lose the metal nanoparticle or metal ion characteristics since they are strongly coordinated to the metal nanoparticle or the metal ion. In addition, the aggregation of the metal nanoparticle or the metal ion due to the reaction of the coloring pigment or dye can be further reduced.

An example of the imino group can be represented by the following formula (3). In the formula (3), $R^5$ is a hydrogen atom, an alkyl group, or an aryl group. The examples of the alkyl group and the aryl group are described above.

[Chemical Formula 5]

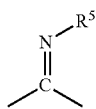

(3)

The organic ligand is represented by the formula (1) where $R^1$ is preferably a group represented by the formula (2), and $R^2$ is preferably a group represented by the formula (2) or a carbonyl group. In addition, each of $R^3$ and $R^4$ is preferably a hydrogen atom, an alkyl group or an aryl group and is more preferably a hydrogen atom or an alkyl group.

Examples of the organic ligand according to the present embodiment are 2-mercaptoethanol, 1,2-ethanedithiol, 2-mercaptoethylamine, 2-mercaptoacetic acid, and 2-mercaptoacetamide. 2-mercaptoacetic acid and 2-mercaptoethylamide are particularly preferred. Also, only one type of organic ligands can be used or two or more types of organic ligands can be used in combination.

According to the present embodiment, the metal compound is made by coordinating the organic ligand to the metal nanoparticle and/or the metal ion. A method of coordinating the organic ligand to the metal nanoparticle and/or the metal ion is not particularly limited. For example, the metal compound can be obtained by dispersing the organic ligand and the metal nanoparticle and/or the metal ion in a solvent.

A metal salt including the metal ion described above and a counter anion can be used as a metal ion supply source. Examples of the counter anion can be a halogenide ion such as a chloride ion, a bromide ion, and an iodide ion; a nitrate ion; a hydrogencarbonate ion; a carbonate ion; and a sulfate ion.

The concentration of the metal compound in the water-based ink is preferably 1 to 2000 mass ppm based on the total mass of the water-based ink, and is more preferably 10 to 1000 mass ppm. If the concentration of the metal compound is within the range(s), the water-based ink has more characteristics that belong to the metal nanoparticle or the metal ion and simultaneously the aggregation of the metal nanoparticle and the metal ion is further reduced.

Examples of the coloring pigment can be carbon blacks of MA8, MA100 (product of Mitsubishi Kasei Corp.), color black FW 200 (product of Degussa) as a black pigment. A self-dispersing pigment capable of being dispersed or dissolved in water without a dispersing agent can be used as a carbon black. The self-dispersing pigment can be obtained by surface-treatment so as to attach at least one type of hydrophilic groups (such as carbonyl, carboxyl, hydroxyl or sulfone groups) or their salts. Examples of the surface treatment of the self-dispersing pigment are disclosed in the Japanese Patent Laid-open No. H08-3498 and the Japanese Patent Laid-open No. 2000-513396. The currently available products such as CAB-O-JET (Trademark) 200, 300 (product of Cabot Corporation), BONJET (Trademark) CW1 (product of ORIENT CHEMICAL INDUSTRIES CO., LTD.) can be used as the self-dispersing pigment. C. I. pigment yellow 3, 13, 74, 83 and 154 as a yellow pigment, C.I. pigment red 5, 48, 112, 122, 177, 202, and 207 as a magenta pigment, C. I. pigment blue 15, 15:3, 15:4, 16, and 60 as a cyan pigment can be used but are not limited to.

The concentration of the coloring pigment in the water-based ink is preferably 0.1 to 20 mass % on the total mass of the water-based ink and is more preferably 1 to 10 mass %.

An example of the coloring dye can be a water soluble dye. The water soluble dye is preferred for inkjet recording ink. Direct dye, acid dye, basic dye, and reactive dye satisfying required functions such as clarity, water solubility, stability, and light stability can be used as the water soluble dye. Moreover, the dye structure is preferably classified as azo dye, metal complex dye, naphthol dye, anthraquinone dye, indigo dye, carbonium dye, quinonimine dye, xanthene dye, aniline dye, quinolline dye, nitro dye, nitroso dye, benzoquinone dye, naphthoquinone dye, phthalocyanine dye, and metal phthalocyanine dye.

Specific examples of the water soluble dye are direct dye such as C. I. direct black 17, 19, 32, 51, 71, 108, 146, 154, and 168, C. I. direct yellow 12, 24, 26, 27, 28, 33, 39, 58, 86, 98, 100, 132, and 142, C. I. direct red 4, 17, 28, 37, 63, 75, 79, 80, 83, 99, 220, 224, and 227, C. I. direct violet 47, 48, 51, 90, and 94, C. I. direct blue 1, 6, 8, 15, 22, 25, 71, 76, 80, 86, 90, 106, 108, 123, 163, 165, 199, and 226; acid dye such as C. I. acid black 2, 7, 24, 26, 31, 52, 63, 112, and 118, C. I. acid yellow 3, 11, 17, 19, 23, 25, 29, 38, 42, 49, 59, 61, 71, and 72, C. I. acid red 1, 6, 8, 17, 18, 32, 35, 37, 42, 51, 52, 57, 80, 85, 87, 92, 94, 115, 119, 131, 133, 134, 154, 181, 186, 249, 254, 256, 289, 315, 317, and 407, C. I. acid violet 10, 34, 49, and 75, C. I. acid blue 9, 22, 29, 40, 59, 62, 93, 102, 104, 113, 117, 120, 167, 175, 183, 229, and 234; basic dye such as C. I. basic black 2, C. I. basic yellow 40, C. I. basic red 1, 2, 9, 12, 13, 14, and 37, C. I. basic violet 7, 14, and 27, C. I. basic blue 1, 3, 5, 7, 9, 24, 25, 26, 28, and 29; and reactive dye such as C. I. reactive yellow 2, 3, 13, and 15, C. I. reactive red 4, 23, 24, 31, 56, and 180, C. I. reactive blue 7, 13, and 21.

The concentration of the coloring dye in the water-based ink is preferably 0.1 to 20 mass % based on the total mass of the water-based ink and is more preferably 1 to 10 mass %.

The coloring dye included in the water-based ink according to the present embodiment does not have any particular limitations. If the coloring dye is anionic dye, the advantageous effects of the present disclosure will be drastically enhanced. Since the effect of aggregating the metal nanoparticle or the metal ion is extremely strong in the anionic dye, it was conventionally difficult to use the anionic dye with the metal nanoparticle or the metal ion in combination. The water-based ink according to the present embodiment can sufficiently reduce the aggregation of the metal nanoparticle or the metal ion with the anionic dye by using the metal compound explained above even if the anionic dye is used.

The water-based ink can include other elements besides the elements explained above. For example, the water-based ink preferably includes a dispersing agent if the water-based ink includes the coloring pigment.

If the coloring pigment is dispersed by the dispersing agent, the dispersing agents for the conventional inkjet recording apparatus can be used. Examples of a dispersing agent can be a polymer dispersing agent, and water soluble surfactant.

Hydrophilic polymers can be used as the polymer dispersing agent. Natural polymers of the hydrophilic polymers are a vegetable polymer such as arabia gum, tragacanth gum, guar gum, locust bean gum, arabinogalactan, pectin, and quince ceed starch; seaweed polymers such as alginic acid, carrageenan, and agar; animal polymers such as gelatin, casein, albumin, and collagen; microbial polymer such as xanthan gum and dextran. Semi-synthetic polymers of the hydrophilic polymers are cellulose polymers such as methylcellulose, enthylcellulose, hydroxyethylcellulose, hydroxypropylcellulose, and carboxymethylcellulose; starch polymers such as sodium starch glycolate, and sodium starch phosphate ester; and seaweed polymers such as sodium alginate and propylene glycol alginate ester. Pure synthetic polymers of the hydrophilic polymers are polyacrylic acid, polymethacrylic acid, acrylic acid-acrylonitrile copolymer, vinylacetate-acrylic acid ester copolymer, acrylic acid-acrylic acid alkyl ester copolymer, styrene-acrylic acid copolymer, styrene-methacrylic acid copolymer, styrene-acrylic acid-acrylic acid alkyl ester copolymer, styrene-methacrylic acid-acrylic acid alkyl ester copolymer, styrene-α-methylstyrene-acrylic acid copolymer, styrene-α-methylstyrene-acrylic acid alkyl ester copolymer, styrene-maleic acid copolymer, vinylnaphthalene-maleic acid copolymer, vinylacetate-ethylene copolymer, vinylacetate-fatty acid vinyl ethylene copolymer, vinylacetate-maleic ester copolymer, vinylacetate-crotonic acid copolymer, vinylacetate-acrylic acid copolymer and their salts. The weight-average molecular weight of these copolymers is preferably 3000 to 50000, is more preferably 5000 to 30000, and even more preferably 7000 to 15000.

The polymer dispersing agents stably disperse the pigment and one or more types of the polymer dispersing agents can be properly used as long as the advantageous effects of the present embodiment are not lost. The content ratio (mass ratio) of the pigment and the dispersing agent is in the range of 1:0.03 to 1:3 and is more preferably in the range of 1:0.125 to 1:3.

An anion surfactant (anionic dispersing agent) is a water-soluble surfactant that can be used as the dispersing agent. Specific examples of the anion surfactant are alkylaryl or alkyl naphthalene sulfonate, alkyl phosphate, alkyl sulfate, alkyl sulfonate, alkyl ether sulfate, alkyl sulfosuccinate, alkyl ester sulfate, alkyl benzene sulfonate, alkyl diphenyl ether disulfonate, alkylaryl ether phosphate, alkylaryl ether sulfate, alkylaryl ether ester sulfate, olefin sulfonate, alkane olefin sulfate, polyoxyethylene alkyl ether phosphate, polyoxyethylene dialkyl ether sulfate, ether carboxylate, sulfosuccinate, α-sulfo fatty ester, aliphatic acid salt, condensate of higher aliphatic acid and amino acid, and naphthenate. Cation surfactants (cationic dispersing agents) include alkylamine salt, dialkylamine salt, aliphatic amine salt, benzalkonium salt, quaternary ammonium salt, alkylpyridium salt, imidazolinium salt, sulfonium salt, and phosphonium salt. Nonionic surfactants (nonionic dispersing agents) include polyoxyethylene alkyl ether, polyoxyethylene alkyl aryl ether, polyoxyethylene alkyl phenyl ether, polyoxyethylene glycol ester, polyoxyethylene fatty acid amide, polyoxyethylene fatty acid ester, polyoxyethylene polyoxyproplene glycol, glycerin ester, sorbitan ester, sucrose ester, polyoxyethylen ether of glycerin ester, polyoxyethylene ether of sorbitan ester, polyoxyethylene ether of sorbitol ester, aliphatic alkanol amide, amine oxide, polyoxyethylene alkyl amine, glycerin aliphatic ester, sorbitan fatty acid ester, polyoxyethylene sorbitan fatty acid ester, polyoxyethylene sorbitol fatty acid ester, and alkyl (poly)glycoside. Amphoteric surfactants (amphoteric dispersing agents) include imidazoline derivatives such as limidazolinium betaine, dimethyl alkyl lauryl betain, alkylglycine, alkyldi(aminoethyl)glycine. The water-soluble surfactant used as a dispersing agent stably disperses the coloring pigment and one or more types of surfactants can be properly added as long as the advantageous effects of the present disclosure are not affected.

The dispersing agent included in the water-based ink is not particularly limited. However, if an anionic dispersing agent is used, the advantageous effects of the present disclosure are drastically enhanced. Since the anionic dispersing agent similar to the anionic dye has a strong reaction for aggregating the metal nanoparticle or the metal ion, it was conventionally difficult to use the anionic dispersing agent with the metal nanoparticle or the metal ion. The water-based ink according to the present embodiment can sufficiently reduce the aggregation of the metal nanoparticle or the metal ion by using the metal compound described above even if the anionic dispersing agent is used.

The water-based ink can further include an aqueous resin and a water-soluble organic solvent.

In order to improve the adherence of the ink, acrylic, aqueous urethane, styrene-butandiene, or polyester emulsion is preferably mixed to the aqueous resin. Particularly, an acrylic-urethane copolymer emulsion is preferably mixed to the aqueous resin. The emulsion is preferably an acrylic-urethane block copolymer (copolymer in which a urethane is grafted from side chain of an acrylic main chain) emulsion. The weight-average molecular weight of the copolymer in the emulsion is preferably 10000 to 300000 and is more preferably 20000 to 250000. The solid concentration of the emulsion in the water-based ink is preferably 0.01 to 10 mass % and is more preferably 0.05 to 5 mass %.

Aqueous organic solvents used in the water-based ink are at large divided into moistening agents and penetrating agents. The aqueous organic solvent used as the moistening agent is added to the ink to prevent the nozzles of the inkjet heads from being blocked. Specific examples of the moistening agent can be aqueous glycol such as glycerin, ethylene glycol, diethylene glycol, triethylene glycol, polyethylene glycol, propylene glycol, 1,5-pentanediol, and 1,6-hexanediol. The concentration of the aqueous organic solvent used as the moistening agent is generally in the range of 5 to 50 mass %, is preferably in the range of 10 to 40 mass %, and is more preferably in the range of 15 to 35 mass % based on the total mass of the water-based ink. The aqueous organic solvent of less than 5 mass % is not sufficient to prevent the nozzles from being blocked. On the other hand, the aqueous organic solvent of greater than 50 mass % is not preferred because ink discharge is difficult due to the increased viscosity of the ink.

The aqueous organic solvent is added to the water-based ink as a penetrating agent to penetrate the ink inside of the recording medium and to control the surface tension of the water-based ink when the ink is used for printing. Specific examples of the penetrating agent are glycol ether such as alkyl ether of ethyleneglycol and propylenglycol. Specific examples of ethyleneglycol alkylether are ethyleneglycol methylether, ethylene glycolether, ethylene glycol-n-propylether, ethylene glycol-n-butylether, ethylene glycol isobutyl ether, diethylene glycol methyl ether, diethylene glycol ethylether, diethylene glycol-n-propylether, dietherglycol-n-butylether, diethylene glycol isobutylether, triethylene glycol methylether, triethylene glycol ethylether, triethylene glycol-n-propylether, triethylene glycol-n-butylether, and triethylene glycol isobutylether. Specific examples of propylene glycol alkylether are propylene glycol methylether, propylene glycol ethylether, propleneglycol-n-propylether, propylene glycol-n-butylether, diproplene glycol methylether, diproplene glycol ethylether, diproplene glycol-n-propylether, diproplene glycol-n-butylether, triproplene glycol methylether, triproplene glycol ethylether, triproplene glycol-n-propylether, and triproplene glycol-n-butylether.

The concentration of the aqueous organic solvent used as the penetrating agent is generally in the range of 1 to 10 mass % and preferably in the range of 1 to 7 mass %. If it is less than 1 mass %, penetration is not sufficient. If it is more than 10 mass %, smearing such as feathering is likely to occur because of too much penetration.

The water-based ink can include another water soluble organic solvent with the moistening agent and the penetrating agent to prevent ink in the front part of the inkjet head from being dried, to increase the print density, and/or to generate clear color. Examples of the water soluble organic solvent are low-grade alcohol such as methyl alcohol, ethyl alcohol, n-propyl alcohol, isopropyl alcohol, n-butyl alcohol, sec-butyl alcohol, and tert-butyl alcohol; amide such as methyl formamid and dimethyl acetoamide; ketone or ketone alcohol such as acetone and diacetone alcohol; ether such as tetra hydorfuran and dioxane; glycerin; pyrrolidone such as 2-pyrrolidone and N-methyl-2-pyrrolidone; and 1,3-dimethyl-2-imidazolidinone.

Various surfactants can be added to control the surface tension of the water-based ink. Examples of the surfactants can be anionic surfactants such as high-grade alcohol ester sulfate, liquid fatty acid ester sulfate, alkyl aryl sulfonate; and nonanionic surfactants such as polyoxy ethylene alkyl ether, polyoxy ethylene alkyl ester, sorbitan alkyl ester, and polyoxy ethylene sorbitan alkyl ester.

The pH of the water-based ink is preferably in the range of 5 to 10 and is more preferably in the range of 7 to 9. The aggregation of the metal compound in the water-based ink can be further reduced. The pH of the water-based ink can be controlled by adding alkai such as alkai metal hydroxides (NaOH, KOH, LiOH) or organic amine (e.g. arylamine), if necessary.

Although proper description of the present disclosure has been described, the present disclosure is not limited to the embodiments described above.

EMBODIMENT

Although the present disclosure will now be described in more detail according to embodiments, the present disclosure is not limited to the embodiments.

[Embodiment 1]

A metal compound including water-based ink is obtained by adding in each of black, cyan, yellow and magenta of the water-based ink the metal compound in which a silver nanoparticle (average particle diameter: 10 nm) is coordinated to 2-mercapto acetic acid. It is added such that its concentration is 1000 mass ppm. The water-based ink (product model name: 'acidic dye ink', product of MIMAKI ENGINEERING CO., LTD.) includes acidic dye, aqueous organic solvent, and water. The pH of the obtained water-based ink having the metal compound was 9.0.

The water-based ink including the metal compound was stored in a stable condition for six months and whether the aggregation occurred was observed. It was confirmed that the aggregation of the metal compound was sufficiently reduced because there was no aggregation.

When a textile printer of MIMAKI ENGINEERING CO., LTD. printed on a silk by using the water-based ink including the metal compound for six months, the nozzles were not blocked and the ink was stably discharged. After printing, a printed textile was obtained at 104° C. for 160 minutes through streaming, water-washing, and drying.

A piece of clothes was made from the printed textile and worn for three days. It was tested whether it had an odor and there was no odor. For comparison, a color printed textile was made with the acidic dye ink without the metal compound. It was worn for three days and tested for odor. A foul odor was detected. Thus, it was confirmed that the water-based ink including the metal compound had the antibacterial characteristics.

Furthermore, the color printed textile by using the water-based ink including the metal compound was tested in the same manner after washing the color printed textile ten times in lukewarm water. Since there was no odor, it is confirmed that the textile has durability and resistance to laundering for antibacterial effect by the water-based ink including the metal compound.

[Embodiment 2]

A metal compound including water-based ink is obtained by adding in each of black, cyan, yellow and magenta of water-based ink the metal compound in which a silver nanoparticle (average particle diameter: 20 nm) and a cobalt nanoparticle (average particle diameter: 20 nm) are coordinated to mercaptoethylamine. It is added such that its concentration is 100 mass ppm. The water-based ink (product model name: 'acidic dye ink', product of MIMAKI ENGINEERING CO., LTD.) includes acidic dye, aqueous organic solvent, and water. The pH of the obtained water-based ink having the metal compound is 8.0.

The water-based ink including the metal compound was stored in a stable condition for six months and whether the aggregation occurred was observed. It was confirmed that the aggregation of the metal compound was sufficiently reduced because there was no aggregation.

When a textile printer of MIMAKI ENGINEERING CO., LTD. printed on a cotton cloth by using the water-based ink including the metal compound for six months, the nozzles were not blocked and the ink was stably discharged. After printing, a printed cotton cloth was obtained at 104° C. for 160 minutes through streaming, water-washing, and drying.

The printed cotton cloth was left at 30° C. in a condition of 80% RH for one month. There was no odor and no defect on the cotton surface. For comparison, a color printed cotton cloth was made with the acidic dye ink without the metal compound. It was left at 30° C. in a condition of 80% RH for one month. There was bacteria on the cotton surface with a foul odor. Thus, it is confirmed that the water-based ink including the metal compound has antibacterial and antimicrobial character.

Furthermore, the color printed cotton cloth by using the water-based ink including the metal compound was tested in the same manner after washing it five times in lukewarm water. Since there was no odor and no defect on the cotton surface, it is confirmed that the cloth has durability and resistance to laundering for antibacterial and antimicrobial effects by the water-based ink including the metal compound.

What is claimed is:

1. A water-based ink comprising:
   a metal compound in which an organic ligand is coordinated to a metal ion; and a coloring pigment and/or a coloring dye, wherein the metal compound is present in an Amount of 1 to 2000 mass ppm based on a total mass of the water-based ink.

2. The water-based ink of claim 1, wherein the metal compound is a silver compound and/or a cobalt compound.

3. The water-based ink of claim 1 or 2, wherein the organic ligand is a compound comprising a sulfur atom.

4. The water-based ink of claim 1, wherein the organic ligand is a compound represented by the following formula (1):

wherein each of $R^1$ and $R^2$ is a group represented by the following formula (2), a carbonyl group, or an imino group, and X is a coordinating functional group:

(2)

wherein each of $R^3$ and $R^4$ is a hydrogen atom, an alkyl group, an aryl group, an alkyloxy group, or an aryloxy group.

5. The water-based ink of claim 1, wherein the organic ligand is 2-mercaptoacetic acid or 2-mercaptoethylamine.

6. The water-based ink of claim 1, wherein the metal ion has an average particle diameter of 6 to 100 nanometers.

7. The water-based ink of claim 1, wherein a pH of the water-based ink is in the range of 5 to 10.

8. The water-based ink comprising:
a metal compound in which an organic ligand is coordinated to a metal ion; and
a coloring pigment and/or a coloring dye, wherein the organic ligand is a compound represented by the following formula (1):

wherein each of $R^1$ and $R^2$ is a group represented by the following formula (2), a carbonyl group, or an imino group, and X is a coordinating functional group:

(2)

wherein each of $R^3$ and $R^4$ is a hydrogen atom, an alkyl group, an aryl group, an alkyloxy group, or an aryloxy group.

9. The water-based ink comprising:
a metal compound in which an organic ligand is coordinated to a metal ion; and
a coloring pigment and/or a coloring dye, wherein the organic ligand is 2-mercaptoacetic acid or 2-mercaptoethylamine.

* * * * *